United States Patent
Chen et al.

(10) Patent No.: US 12,465,067 B2
(45) Date of Patent: Nov. 11, 2025

(54) SUGAR REDUCTION OF FOOD PRODUCTS

(71) Applicant: KONINKLIJKE PHILIPS N.V., Eindhoven (NL)

(72) Inventors: Yun Chen, Eindhoven (NL); Anna Louise Wijnoltz, Eindhoven (NL); Jasper De Vreede, Eindhoven (NL)

(73) Assignee: VERSUNI HOLDING B.V., Eindhoven (NL)

( * ) Notice: Subject to any disclaimer, the term of this patent is extended or adjusted under 35 U.S.C. 154(b) by 698 days.

(21) Appl. No.: 17/438,800

(22) PCT Filed: Feb. 14, 2020

(86) PCT No.: PCT/EP2020/053966
§ 371 (c)(1),
(2) Date: Sep. 13, 2021

(87) PCT Pub. No.: WO2020/187504
PCT Pub. Date: Sep. 24, 2020

(65) Prior Publication Data
US 2022/0142212 A1    May 12, 2022

(30) Foreign Application Priority Data

Mar. 15, 2019 (WO) ................ PCT/CN2019/078332
Apr. 16, 2019 (EP) ..................................... 19169590

(51) Int. Cl.
*A23L 5/20*     (2016.01)
*A23L 2/04*     (2006.01)
(Continued)

(52) U.S. Cl.
CPC ................ *A23L 5/21* (2016.08); *A23L 2/04* (2013.01); *A23L 19/09* (2016.08); *A47J 19/02* (2013.01);
(Continued)

(58) Field of Classification Search
None
See application file for complete search history.

(56) References Cited

U.S. PATENT DOCUMENTS 4,667,590 A * 5/1987 Balaam ................ F28F 19/008
99/470
5,755,155 A * 5/1998 Buesing ................... A23C 7/02
99/452
(Continued)

FOREIGN PATENT DOCUMENTS

CN      106071490 A    11/2016
CN      107692804 A     2/2018
(Continued)

OTHER PUBLICATIONS

Fenn, B. N., "Development of Juice Extraction Process for Aonla Fruit", Jul. 2010.
(Continued)

*Primary Examiner* — Thor S Campbell
(74) *Attorney, Agent, or Firm* — Maschoff Brennan

(57) ABSTRACT

A food processing apparatus and a method for reducing sugar content of a food product is disclosed. The food processing apparatus includes a food processing compartment including a blade arrangement and a fluid release valve, a base including a motor arranged to drive the blade arrangement, a heating arrangement for heating a food product with steam, and a controller. The heating arrangement includes a water tank and a heating element thermally coupled to the water tank. The controller controls the heating element to heat the food product in the food processing compartment with steam for a defined period of time, and controls the motor to blend the food product upon termination of the heating of the food product for the defined period of time and upon releasing steam condensate generated (Continued)

during the heating of the food product from the food processing compartment through the fluid release valve.

12 Claims, 8 Drawing Sheets

(51) Int. Cl.

| | | |
|---|---|---|
| *A23L 19/00* | (2016.01) | |
| *A47J 19/02* | (2006.01) | |
| *A47J 43/044* | (2006.01) | |
| *A47J 43/046* | (2006.01) | |
| *A47J 43/07* | (2006.01) | |
| *A47J 43/08* | (2006.01) | |

(52) U.S. Cl.
CPC .......... *A47J 43/044* (2013.01); *A47J 43/046* (2013.01); *A47J 43/0711* (2013.01); *A47J 43/0722* (2013.01); *A47J 43/0727* (2013.01); *A47J 43/082* (2013.01); *A47J 43/085* (2013.01); *A23V 2002/00* (2013.01); *A47J 2202/00* (2013.01)

(56) References Cited

U.S. PATENT DOCUMENTS

| | | | |
|---|---|---|---|
| 6,550,372 B1 | 4/2003 | Sharples | |
| 6,994,016 B1* | 2/2006 | Bunker | A23L 3/01 |
| | | | 99/348 |
| 8,960,082 B2 | 2/2015 | Bjoerk et al. | |
| 10,064,420 B2* | 9/2018 | Schopp | A23L 23/00 |
| 10,638,781 B2* | 5/2020 | Van Doorn | A23L 19/18 |
| 10,974,211 B1* | 4/2021 | Beason | B01F 35/2132 |
| 11,166,469 B1* | 11/2021 | Emery | A21B 5/02 |
| 2002/0034571 A1* | 3/2002 | Zimmerman | A23L 7/117 |
| | | | 426/549 |
| 2004/0237798 A1* | 12/2004 | Payne | A47J 27/04 |
| | | | 99/348 |
| 2007/0275153 A1 | 11/2007 | Somsen et al. | |
| 2008/0160149 A1* | 7/2008 | Nasrallah | A23L 5/55 |
| | | | 96/225 |
| 2011/0003048 A1* | 1/2011 | Sugimoto | A47J 27/086 |
| | | | 99/468 |
| 2011/0104345 A1 | 5/2011 | Bhaskar et al. | |
| 2011/0293782 A1 | 12/2011 | Katzir et al. | |
| 2013/0334349 A1* | 12/2013 | Carden | A47J 43/046 |
| | | | 241/101.2 |
| 2017/0143153 A1* | 5/2017 | Linton | A47J 27/004 |
| 2017/0181459 A1 | 6/2017 | Harvey et al. | |
| 2017/0325635 A1 | 11/2017 | Wang et al. | |
| 2020/0060480 A1* | 2/2020 | Zhu | A47J 43/046 |
| 2023/0225543 A1* | 7/2023 | Shami | A47J 36/10 |
| | | | 99/324 |

FOREIGN PATENT DOCUMENTS

| | | |
|---|---|---|
| GB | 2390985 A | 1/2004 |
| JP | 5994214 B2 | 9/2016 |
| WO | 2008039646 A2 | 4/2008 |
| WO | 2013035029 A1 | 3/2013 |
| WO | 2018234252 A1 | 12/2018 |

OTHER PUBLICATIONS

Extended European Search Report issued in connection with corresponding EP Application No. 19169590.7 dated Oct. 15, 2019.
International Search Report and Written Opinion issued in connection with corresponding PCT Application No. PCT/EP2020/053966 dated Apr. 17, 2020.

* cited by examiner

ND APPLICATIONS

SUGAR REDUCTION OF FOOD PRODUCTS

CROSS-REFERENCE TO RELATED APPLICATIONS

The present application is a U.S. National Phase application under 35 U.S.C. § 371 of International Application No. PCT/EP2020/053966, filed on Feb. 14, 2020, which claims the benefit of European Patent Application No. 19169590.7, filed on Apr. 16, 2019, and International Application No. PCT/CN2019/078332, filed on Mar. 15, 2019. These applications are hereby incorporated by reference herein.

FIELD OF THE INVENTION

The present invention relates to a food processing apparatus comprising a food processing compartment including a blade arrangement; a base including a motor arranged to drive the blade arrangement; a heating arrangement for heating a food product in the food processing compartment; and a controller arranged to control the motor.

The present invention further relates to a method of operating such a food processing apparatus.

BACKGROUND OF THE INVENTION

In order for a person to follow a healthy diet, a balanced intake of the various essential nutrients making up such a diet is typically required whilst not exceeding recommended daily calorie targets. Indeed, in many developed countries, healthcare problems have become commonplace due to people following unhealthy diets in which too many fats, sugars and/or calories are being consumed on a regular basis. This can lead to chronic and potentially life-threatening conditions such as obesity and type 2 diabetes for example.

For this reason, vegetable and in particular fruit-based processed food products such as vegetable and/or fruit-based juices or smoothies have become increasingly popular, due to the perceived health benefits of such food products. Indeed, many vegetables and fruits contain many useful nutrients such as vitamins, fibers and carbohydrates such as monosaccharides and other sugars. However, the consumption of such food products can also lead to imbalances in a person's diet. For example, such food products can be high in calories, for example due to the sugars therein, which can lead to its consumers not consuming enough other types of essential nutrients, e.g. (unsaturated) fats and proteins. In addition, the high concentration of sugars in such drinks can lead to health issues such as obesity and caries.

It is known per se to treat food products with heat, for instance in order to change their composition. However, many of such processes are applied on an industrial scale, and their deployment in a domestic setting, such as in a kitchen appliance, is far from trivial. An example of such a domestic process and apparatus is disclosed in WO 2013/035029 A1, which discloses a method and device of preparing puree including providing pieces of raw material in a blending unit; heating the pieces of raw material and blending the pieces of raw material when the pieces of raw material have been heated to a first temperature (a reversible deactivation temperature of enzymes in fruit and vegetables), wherein during the blending step, the heating step is controlled such that the temperature of the pieces of raw material being blended is between the first temperature and a second temperature (an irreversible deactivation temperature of enzymes in fruit and vegetables), the second temperature being higher than the first temperature. The deactivation of the enzymes by blending the fruit or vegetables at elevated temperatures ensures that important nutrients such as vitamin C and polyphenols are not decomposed by such enzymes during the blending process. Moreover, the reversible deactivation of the enzymes at temperatures typically ranging from 50–60° C. and subsequent heating of the fruit or vegetables to 70-80° C. or higher during the blending process also prevents unwanted thermal decomposition of such nutrients.

However, such a method and device does not significantly reduce the sugar content of the fruit and vegetables processed in accordance therewith.

SUMMARY OF THE INVENTION

The present invention seeks to provide a food processing apparatus comprising a food processing compartment including a blade arrangement; a base including a motor arranged to drive the blade arrangement; a heating arrangement for heating a food product in the food processing compartment; and a controller arranged to control the motor that is configured to reduce the sugar content of a food product processed with the food processing apparatus.

The present invention further seeks to provide a method of reducing a sugar content of a fruit-based food product processed with such a food processing apparatus.

According to an aspect, there is provided a food processing apparatus for reducing a sugar content of a food product, the food processing apparatus comprising a food processing compartment including a blade arrangement and a fluid release valve; a base including a motor arranged to drive the blade arrangement; a heating arrangement for heating a food product in the food processing compartment with steam, the heating arrangement comprising a water tank in fluid communication with the food processing compartment and a heating element thermally coupled to said water tank; and a controller arranged to control the motor and the heating element; wherein the controller is arranged to control the heating element to generate steam such as to heat the food product in the food processing arrangement for a defined period of time; and control the motor to blend the food product upon termination of the heating of the food product for said defined period of time and upon releasing steam condensate generated during the heating of the food product from the food processing compartment through said fluid release valve.

The present invention is based on the surprising discovery that exposure of the (sliced) food product to such an elevated temperature for a defined period of time notably reduces the sugar content of the food product, such that when the food product is subsequently blended, typically at a temperature below the heating temperature as the heating of the food product preferably has been terminated upon initiation of the blending process, a processed food product such as a juice or a smoothie is produced having a reduced sugar content, which is beneficial in terms of sugar intake control for example. Without wishing to be bound by theory, it is believed that the condensation of the steam on the surface of the food product pieces, e.g. slices, in the food processing compartment leads to sugars at this contact surface being dissolved in this condensate, thereby (further) aiding the reduction of sugar content of the food product in the food processing compartment.

A particularly notable reduction is sugar content of the thus prepared food item is achieved when the defined period of time is in a range of 5-20 minutes.

In an embodiment, the fluid release valve is controlled by the controller, and the controller is adapted to open the fluid release valve for a further defined period of time during said heating of the food product and/or after said heating of the food product. In this manner, the steam condensate can be automatically drained from the food processing compartment without requiring user intervention.

The food processing apparatus may further comprise a steam condensate collection reservoir in fluid communication with said fluid release valve to collect the steam condensate, such that a user does not have to provide a receptacle for collecting the steam condensate, thereby increasing user convenience.

In a preferred embodiment, the food processing apparatus further comprises a user interface communicatively coupled to the controller and comprising a food product selection menu, wherein the defined period of time is a function of the food product selection made with the user interface. This has the advantage that for different food products, such as different types of fruit, optimized heating times for that particular food product may be applied, for instance to optimize sugar reduction in the food product whilst maintaining beneficial constituents of the food product such as vitamin C.

In an embodiment, the controller is arranged to control the motor to blend the food product upon completion of said period of time for a further period of time that is a function of the food product selection made with the user interface. This is beneficial in controlling the consistency of the thus prepared food item, as different types of food, e.g. different types of fruit, may require different blending times to achieve such a desired consistency. In addition, the food product selection menu may comprise a food product weight specification option, such that the further period of time may be a function of a food product weight specified with said food product weight specification option, as different amounts of the selected food product typically will require different blending times to achieve the desired consistency.

The food processing apparatus may further comprise a temperature sensor in said food processing compartment that is communicatively coupled to the controller, wherein the controller is arranged to operate the heating arrangement in response to temperature data provided by said temperature sensor. In this manner, the actual temperature of the food product during the heating-induced sugar content reduction process can be accurately controlled, thereby reducing the risk of loss of beneficial constituents of the food product during this process.

In the example embodiment of the food processing apparatus 10 as schematically depicted in FIG. 3, the food processing compartment 30 is shaped as a removable container having the first surface 32 and an opposing second surface 34 on which the blade arrangement 28 is mounted. Both the first surface 32 and the second surface 34 are arranged to engage with the base 20; the first surface 32 as previously explained is arranged to allow passage of the steam generated in the water tank 40 with the heating element 42 into the food processing compartment 30, whereas the second surface 34 when positioned onto the base 20 engages the blade arrangement 28 with the motor 22 in the base 20, e.g. through a driveshaft 24, a gearbox or the like, as schematically shown in FIG. 4. Hence, upon completion of the free sugar-reducing heating process, the user may turn the container acting as the food processing compartment 30 upside down in order to disengage the first surface 32 from the base 20 and engage the second surface 34 with the base 20 instead such that the previously described blending operation of the food product 1 may be subsequently engaged. Although this requires manual intervention in order to perform the blending process after the heating process, it has the advantage that a particularly compact food processing apparatus 10 is provided owing to the fact that the water tank 40 can be positioned within the base 20.

In an example embodiment, the water tank is located in the base and the food processing compartment comprises a container having a first surface comprising at least one aperture for injecting steam from the water tank into the food processing compartment and a second surface comprising the blade arrangement, and wherein each of the first surface and the second surface can be fitted onto the base. This has the advantage that a particularly compact food processing apparatus can be provided, in which after the heating step the blending step may be invoked simply by a user manually turning the container upside down in order to change the contact surface of the container with the base from the first surface comprising the one or more aperture to the second surface comprising the blade arrangement.

In an alternative example embodiment, the water tank is arranged adjacent to the food processing compartment, and wherein a partition between the water tank and the food processing compartment comprises at least one aperture for injecting steam from the water tank into the food processing compartment. This may increase the footprint of the food processing apparatus somewhat compared to the previous example embodiment, but it has the advantage that the heating and blending steps may be performed in sequence by the food processing apparatus without necessarily requiring user intervention.

The food processing apparatus typically is a kitchen appliance for use in a domestic or commercial kitchen. For example, the food processing apparatus may be a blender or a juice maker.

In accordance with another aspect, there is provided a method of reducing a sugar content of a food product with a food processing apparatus comprising a food processing compartment including a blade arrangement and a fluid release valve; a base including a motor arranged to drive the blade arrangement; a heating arrangement for heating a food product in the food processing compartment with steam, the heating arrangement comprising a water tank in fluid communication with the food processing compartment and a heating element thermally coupled to said water tank; and a controller arranged to control the motor and the heating element; the method comprising heating the food product in the food processing compartment to a temperature in a range of 60-90° C. with steam generated with the heating element for a defined period of time; and controlling the motor to blend the food product upon completion of said heating of the food product for said defined period of time and upon releasing steam condensate generated during the heating of the food product from the food processing compartment through said fluid release valve. With such a method, the sugar content of a food item prepared from such a food product may be notably reduced without significant loss of other nutrients from the food product during the heating step.

The defined period of time preferably is in a range of 5-20 minutes in order to ensure that the sugar content of a food item prepared from such a food product is notably reduced without significant loss of other nutrients from the food product during the heating step.

In an embodiment, the fluid release valve is controlled by the controller, and the method further comprises opening the fluid release valve for a further defined period of time with the controller during said heating of the food product and/or after said heating of the food product in order to further automate the processing of the food product.

Preferably, the method further comprises receiving a food product selection made with a user interface with the controller; and defining the period of time as a function of the received food product selection in order to optimize the sugar content reduction for a particular food product. Such a user interface may form part of the food processing apparatus or may form part of a device in communication with the food processing apparatus such as a smart phone, tablet computer or the like.

The method may further comprise defining the temperature as function of the received food product selection to further optimize the sugar reduction process of the selected food product.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
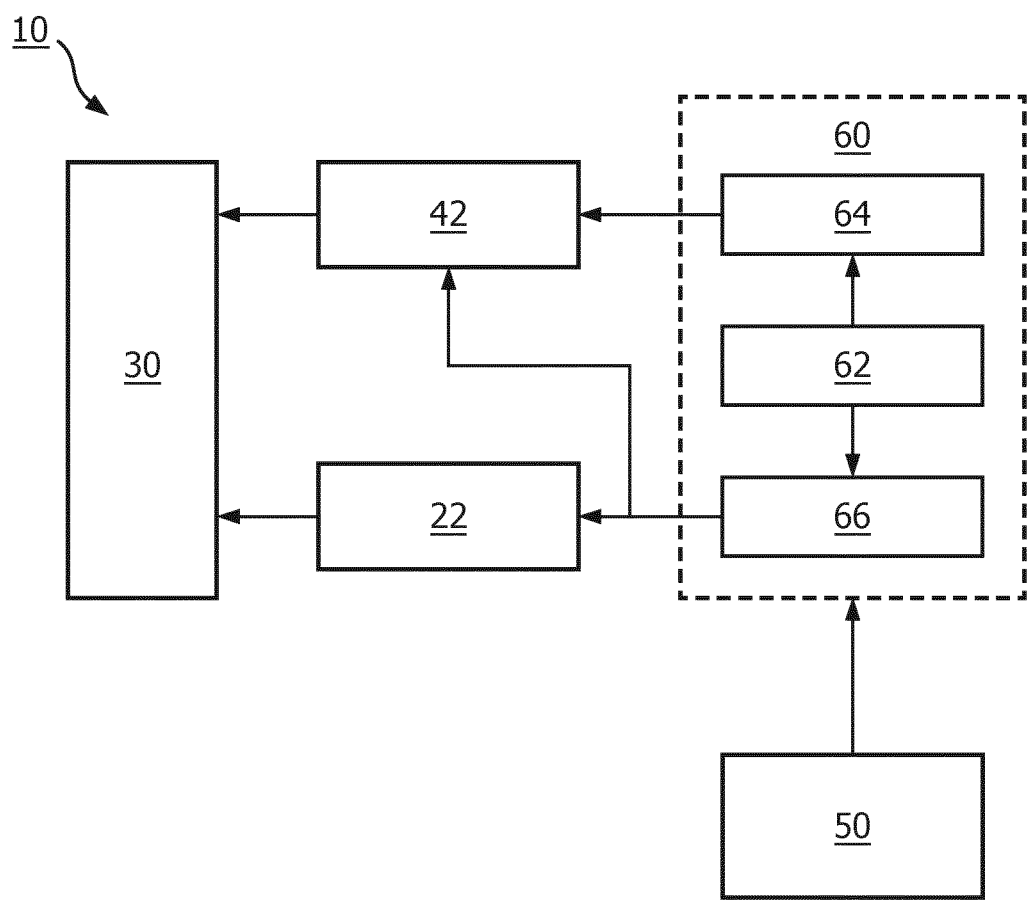
FIG. 1 is a schematic representation of a food processing apparatus according to an embodiment.

It should be understood that the Figures are merely schematic and are not drawn to scale. It should also be understood that the same reference numerals are used throughout the Figures to indicate the same or similar parts.

Embodiments of the present invention provide a food processing apparatus that is configured to reduce the free sugar contents of (raw) food products such as vegetables and fruits, most notably fruits as the free sugar content of most fruits is higher than the free sugar contents of vegetables. The food processing apparatus in typical embodiments is a kitchen appliance for use in a domestic or commercial kitchen, such as a blender, juicer or the like. A schematic block diagram of a typical food processing apparatus 10 according to embodiments of the present invention is depicted in FIG. 1. The food processing apparatus 10 comprising a food processing compartment 30, which typically comprises a blade arrangement to macerate or otherwise cut or blend food products. The blade arrangement is driven by a motor 22 under control of a controller 60. The motor 22 may be coupled to the blade arrangement in any suitable manner, e.g. through a drive axle or shaft, gear box and so on. Such types of couplings are well-known per se and are therefore not explained in further detail for the sake of brevity only.

The controller 60 may be any suitable control arrangement comprising one or more physical entities implementing such a control arrangement. For example, the controller 60 may comprise one or more processing units, e.g. suitably programmed generic processors, application specific processors, microcontrollers or the like. The controller 60 may implement an algorithm 62 that is used to control a heating control unit 64 and a timer 66 of the controller 60. The heating control unit 64 and the timer 66 may be implemented in any suitable manner, e.g. as discrete hardware entities or in software on the controller 60.

The food processing apparatus 10 further comprises a heating element 42 responsive to the controller 60. The heating element 42 typically is arranged to generate steam from a water reservoir containing water in order to heat the contents, i.e. the food product, in the food processing compartment 30 with steam to a set temperature. Such a heating step of the food product in the food processing compartment 30, when performed under specific conditions, can be used to reduce the free sugar content of the food product in the food processing compartment 30 due to such sugars at the surface of the food product being dissolved in steam condensing on this surface. This will also be referred to as a steam condensate in the present application. The heating control unit 64 controls the operation of the heating element 42, e.g. to ensure that the contents in the food processing chamber 30 are heated to the appropriate temperature, whereas the timer 66 controls the duration of this heating operation. In addition, the timer 66 may control the duration of a blending operation of the contents in the food processing chamber 30 by operation of the motor 22 following completion of the heating operation. It should be understood that in preferred embodiments the contents of the food processing chamber 30 are not heated during this blending operation and that the temperature of the contents of the food processing chamber 30 may be lower during this blending operation than during the heating operation.

Moreover, prior to blending, the steam condensate is to be removed from the food processing compartment 30 in order to remove the sugars dissolved in the steam condensate from the food product to be blended. This may be achieved manually, e.g. by providing a user with a user instruction to perform the steam condensate removal operation, or automatically, e.g. by the controller 60 operating a fluid release valve in the food processing compartment 30 to remove the steam condensate after or during the heating step.

The controller 60 may be responsive to a user interface 50 through which the food processing apparatus 10 may be controlled. Such a user interface 50 may form part of the food processing apparatus 10, in which case the user interface 50 may be implemented in any suitable manner, e.g. as a touchscreen display, one or more switches, buttons, knobs or dials, and so on, or any combination of such user interface elements. Alternatively, the user interface 50 may be implemented on a remote device, e.g. by way of a software program such as an app, through which the food processing apparatus 10 may be remotely controlled. For example, such a remote device may be a computing device, a mobile communication device such as a smart phone, a tablet computer and so on. In embodiments in which the user interface 50 is implemented on such a remote device, the food processing apparatus 10 typically further comprises a communication module communicatively coupled to the controller 60, preferably a wireless communication module through which the remote device may communicate with the food processing apparatus 10. Such a communication link may be a direct (P2P) link such as a Bluetooth link or the like, or may be an indirect link running through a communication management device such as a server, router or the like. As the technology involved with such communication links is well-known per se, this will not be explained in further detail for the sake of brevity only.

Figure 2:
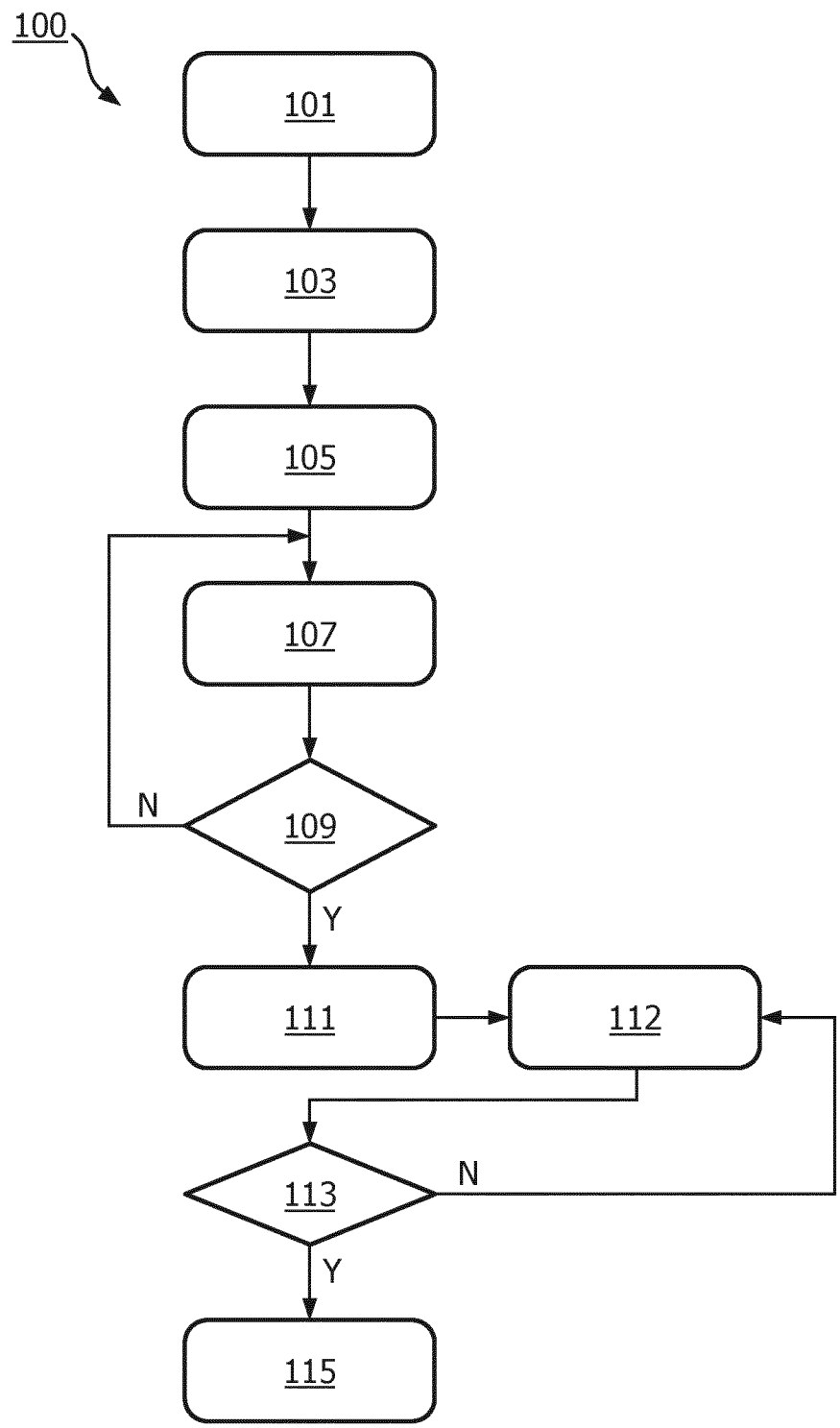
FIG. 2 is a flow chart of a food processing method implemented with a food processor according to an embodiment.

The operation of the food processing apparatus 10 will now be explained in more detail with the aid of FIG. 2, which depicts a flowchart of a method 100 of reducing a sugar content of a food product with such a food processing apparatus. The method 100 starts in operation 101, e.g. by a user loading the food product into the food processing compartment 30 of the food processing apparatus 10. Next, in operation 103 the user of the food processing apparatus 10 operates the user interface 50 such as to initiate the free sugar reduction processing of the food product loaded into the food processing compartment 30.

In a first set of embodiments, this may simply involve the user switching on and/or selecting an appropriate operation of the food processing apparatus 10, e.g. using a function selection menu of the user interface 50. The selected function for example may read "produce food item with reduced sugar content" or similar. Of course, this function may be given any appropriate name. The selection of this function will cause the controller 60 to access the algorithm 62 in operation 105 and operate the food processing apparatus 10 in accordance with the duration and temperatures of the heating step and the duration of the blending step respectively as programmed into the algorithm 62.

In a second set of embodiments, the user operating the user interface 50 in operation 103 not only enables the food processing apparatus 10, e.g. by selecting its appropriate operation, but also specifies the type of food product that has been loaded into the food processing compartment in operation 101. To this end, the user interface 50 may include a food product selection menu from which the user may select the appropriate food product. For example, the food product menu may list a number of different fruits, e.g. apple, pear, orange, tangerine pineapple, kiwi, types of berries such as strawberry, raspberry, blueberry and so on. In these embodiments, the algorithm 62 contains optimized processing parameters, i.e. heating temperature, heating duration and blending duration for each of the listed food products in the food product selection menu such that upon the selection of a particular type of food product the controller 60 selects the appropriate processing parameters of that food product type with the algorithm 62 in operation 105.

In a further refinement, the user interface 50 may include a food product weight specification function to allow a user to specify the (approximate) weight of the food product loaded into the food processing compartment 30. The specified weight may be used by the controller 60 to determine the duration of the blending operation of the food product loaded into the food processing compartment 30, i.e. define the duration of the blending operation as a function of the weight of the food product as specified by the user of the food processing apparatus 10 with the user interface 50. This has the advantage that variation in the consistency of the food item prepared with the food processing apparatus 10 resulting from different amounts of the food product being blended for the same duration of time is reduced.

Upon the aforementioned configuration of the controller 60 in operation 105, the method 100 proceeds to operation 107 in which the food product in the food processing compartment is heated to a defined temperature with steam for a defined period of time with the heating element 42 under control of the controller 60 in order to reduce its free sugar content. The defined temperature of the steam preferably is in a range of 60-90° C. and the defined period of time preferably is in a range of 5-20 minutes. As previously explained, the actual temperature and period of time as deployed by the controller 60 may be a function of the selected food product type, or instead may be a fixed temperature and period of time independent of food product type. The actual temperature in the food processing compartment 30 may be monitored with a temperature sensor in the food processing compartment 30 that provides its temperature readings to the controller 60 such that the controller 60 can operate the heating element 42 in response to the temperature data provided by the temperature sensor in order to ensure that the appropriate temperature is maintained within the food processing compartment 30.

In operation 109 it is checked by the controller 60, e.g. by checking the timer 66, if the heating operation 107 has been completed. If this is not yet the case, the method 100 reverts back to operation 107; otherwise, the method 100 proceeds to operation 111 in which the steam condensate is drained from the food processing compartment 30 for a further period of time, e.g. 1-2 minutes, in order to remove the sugars dissolved in the steam condensate from the food processing compartment 30. Alternatively or additionally, the draining of the steam condensate from the food processing compartment 30 may already commence during the latter stages of the steam heating of the food product. After the steam condensate has been drained from the food processing compartment 30, the method proceeds to operation 112 in which the food product subjected to the steam heating process is subsequently blended with the blade arrangement in the food processing compartment 30 by the controller 60 operating the motor 22 for a defined duration as previously explained. This blending operation may be automatically engaged following the completion of the heating operation of the food product loaded into the food processing compartment 30 or may be manually engaged by the user of the food processing apparatus 10, e.g. through the user interface 50. The blending operation may be implemented in any suitable manner, for example as a continuous blending operation, a pulsed blending operation, and so on. The controller 60 checks in operation 113 if the blending operation 112 has been performed for its defined duration or period of time. If this is not yet the case, the method 100 reverts back to operation 112; otherwise, the method 100 proceeds to final operation 115 in which the blending operation is terminated and the final food item, such as a puree, smoothie, juice or the like, has been prepared such that the user of the food processing apparatus 10 can remove the final food item from the food processing compartment 30.

Figure 3:
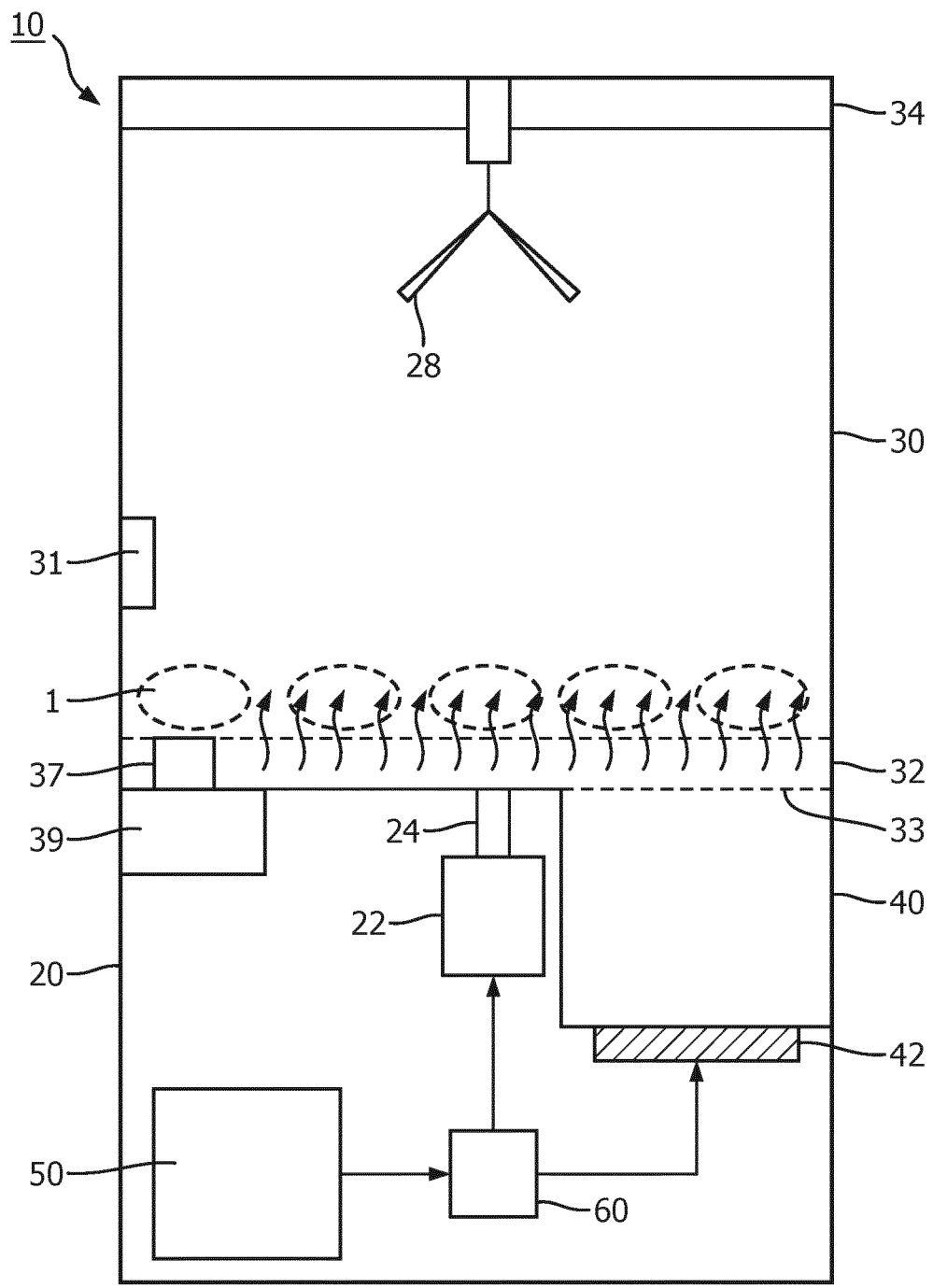
FIG. 3 schematically depicts a cross-sectional view of a food processing apparatus according to an embodiment.

FIG. 3 schematically depicts a cross-sectional view of a food processing apparatus 10 according to an embodiment of the present invention. In this embodiment, the food processing apparatus 10 comprises a base 20 housing the controller 60 and the motor 22 of the blade arrangement 28 in the food processing compartment 30. The food processing apparatus 10 may further comprise the user interface 50, which may be located on the base 20 by way of non-limiting example. The base 20 further houses a water tank 40 thermally coupled to a heating element 42 under control of the controller 60 such that by operation of the heating element 42 as previously explained water stored in the water tank 40 may be converted into steam. In other to allow the thus generated steam to transfer from the water tank 40 into the food processing compartment 30, the food processing compartment 30 may comprise a first surface 32 including at least one aperture 33 fluidly connecting the water tank 40 to the food processing compartment 30, e.g. by acting as the roof of the water tank 40. Unwanted penetration of steam into the base 20 may be prevented in any suitable manner. For example, apart from the water tank 40, the base 20 may be hermetically sealed to prevent such moisture ingress and/or part of the first surface 32 covering moisture-sensitive parts of the base 20 may be hermetically sealed, i.e. not comprise any apertures 33 to prevent such moisture ingress. The at least one aperture 33 may take any suitable shape, such as a plurality of slits or conduits extending through the first surface 32 through which steam can migrate from the water tank 40 into the food processing compartment 30 as indicated by the wavy arrows in FIG. 3.

A temperature sensor 31 may be present in the food processing compartment 30 to monitor the temperature within the food processing compartment 30, which is used to indicate the (approximate) temperature of the food product 1 placed in the food processing compartment 30 by the user of the food processing apparatus 10. Although not explicitly shown for the sake of clarity only, it should be understood that the temperature sensor 31 when present is communicatively coupled to the controller 60 such that the controller 60 can operate the heating element 42 in accordance with the temperature feedback provided by the temperature sensor 31. In this manner, the controller 60 can ensure that the food product 1 exposed to the free sugar-reducing heating process is heated to a temperature in a desired temperature range, such as a range of 60-90° C.

The food processing compartment 30 further comprises a fluid release valve 37 for draining steam condensate from the food processing compartment 30. The fluid release valve 37 preferably is arranged at or near the bottom of the food processing compartment 30 at least when draining the steam condensate from the food processing compartment 30. The fluid release valve 37 may be operated manually, e.g. by a user, or automatically, e.g. by the controller 60. In case of manual operation, the controller 60 may generate a user instruction via the user interface 50 to instruct a user to operate the fluid release valve 37 in order to drain the steam condensate from the food processing compartment 30. The user may be instructed to open the fluid release valve 37 for a further defined period of time, e.g. 1-5 minutes or 1-2 minutes, or instead the user may open the fluid release valve 37 for as long as the user can observe steam condensate releasing from the food processing compartment 30 through the fluid release valve 37. As shown in FIG. 3, the fluid release valve 37 may be fluidly connected to a steam condensate collection reservoir 39, which form part of the food processing apparatus 10 in any suitable manner. Preferably, the steam condensate collection reservoir 39 may be removed from the food processing apparatus 10 to facilitate cleaning of the steam condensate collection reservoir 39. Alternatively, the fluid release valve 37 may form part of a fluid release channel that exits externally to the food processing apparatus 10 such that a user can use any suitable receptacle, e.g. a glass or the like, to collect the steam condensate released from the food processing compartment 30.

Figure 4:
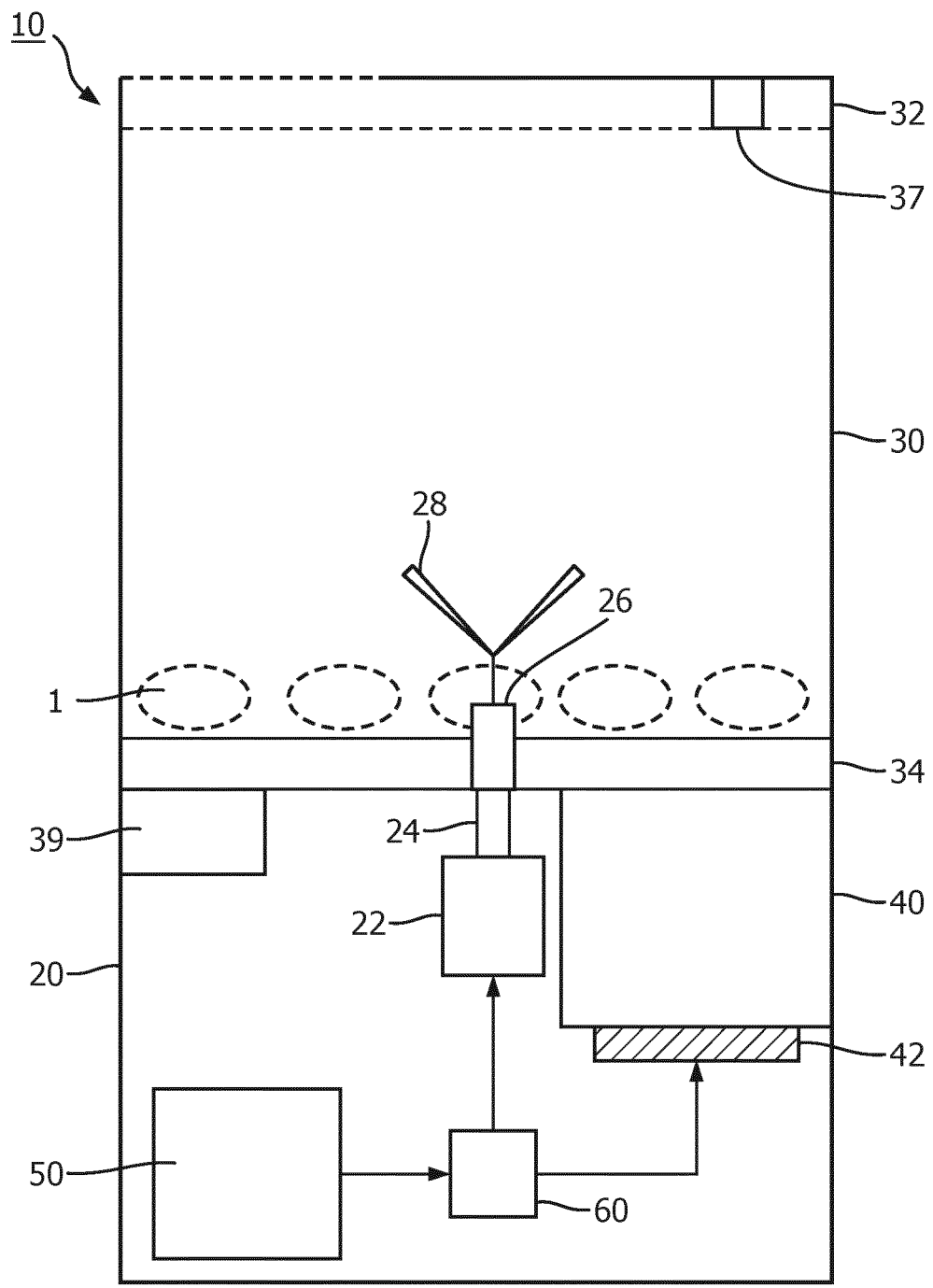
FIG. 4 schematically depicts a cross-sectional view of the food processing apparatus of FIG. 3 in an alternative configuration.

In the example embodiment of the food processing apparatus 10 as schematically depicted in FIG. 3, the food processing compartment 30 is shaped as a removable container having the first surface 32 and an opposing second surface 34 on which the blade arrangement 28 is mounted. Both the first surface 32 and the second surface 34 are arranged to engage with the base 20; the first surface 32 as previously explained is arranged to allow passage of the steam generated in the water tank 40 with the heating element 42 into the food processing compartment 30, whereas the second surface 34 when positioned onto the base 20 engages the blade arrangement 28 with the motor 22 in the base 20, e.g. through a driveshaft 24, a gearbox or the like, as schematically shown in FIG. 4. Hence, upon completion of the free sugar-reducing heating process, the user may turn the container acting as the food processing compartment 30 upside down in order to disengage the first surface 32 from the base 20 and engage the second surface 34 with the base 20 instead such that the previously described blending operation of the food product 1 may be subsequently engaged. Although this requires manual intervention in other to perform the blending process after the heating process, it has the advantage that a particularly compact food processing apparatus 10 is provided owing to the fact that the water tank 40 can be positioned within the base 20.

Figure 5:
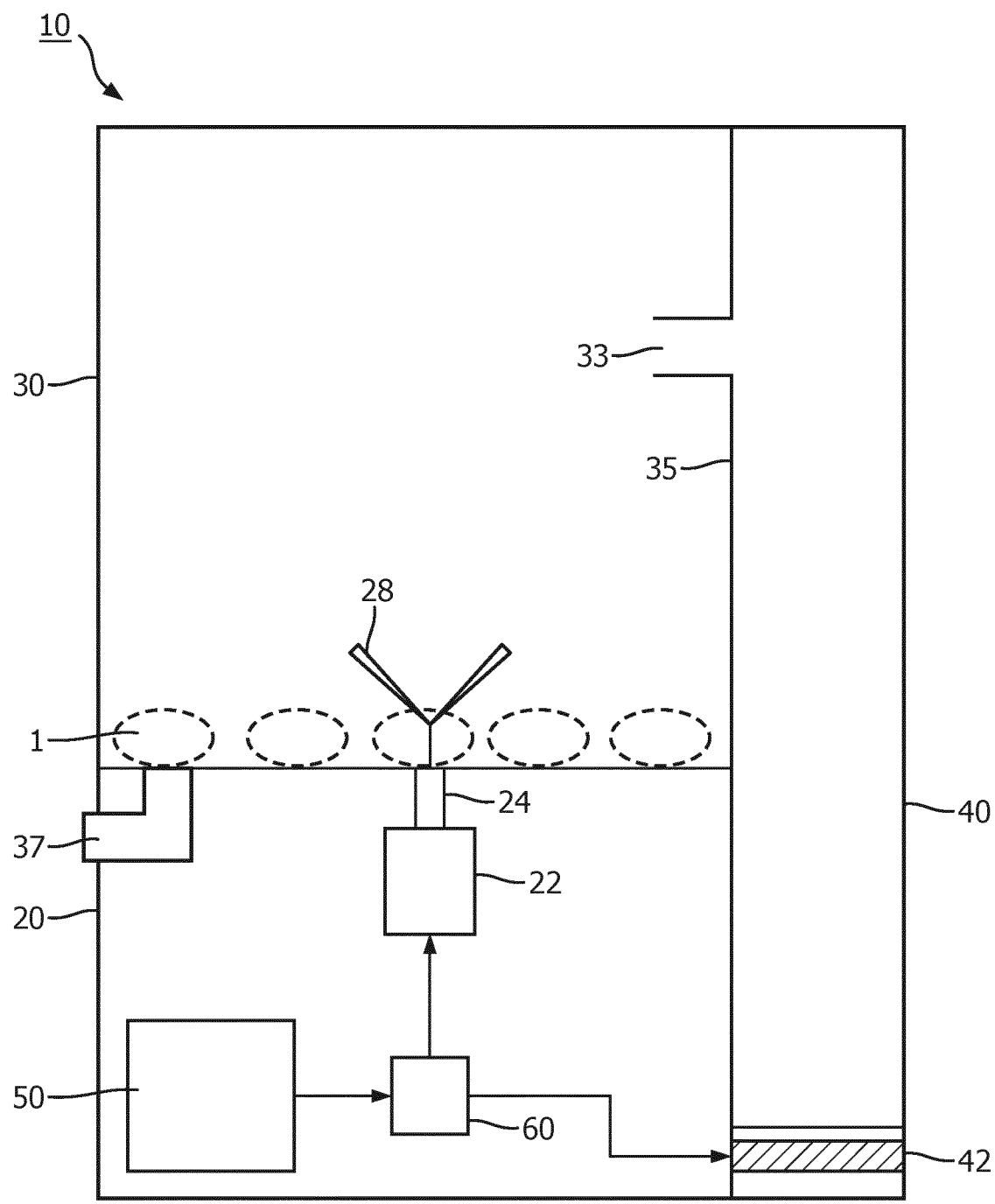
FIG. 5 schematically depicts a cross-sectional view of a food processing apparatus according to another embodiment.

FIG. 5 schematically depicts a cross-sectional view of another example embodiment of the food processing apparatus 10. In this embodiment, the water tank 40 is a separate entity arranged adjacent to the food processing compartment 30, in which a partition wall 35 between the water tank 40 and the food processing compartment 30 comprises at least one aperture 33 through which steam generated from water stored in the water tank 40 by the heating element 42 under control of the controller 60 is injected into the food processing compartment 30 holding the food product 1 in order to reduce its free sugar content as previously explained. As will be readily understood by the skilled person, the at least one aperture 33 is typically located above the maximum fill level of the water tank 40 such that water from the water tank 40 cannot directly enter the food processing compartment 30. The water tank 40 may be removable, as will be readily understood by the skilled person. In addition, and by way of non-limiting example, FIG. 5 shows the fluid release valve 37 forming part of a channel exiting externally to the food processing apparatus 10 as previously explained, thereby obviating the need for a steam condensate collection reservoir 39 forming part of the food processing apparatus 10.

Figure 6:
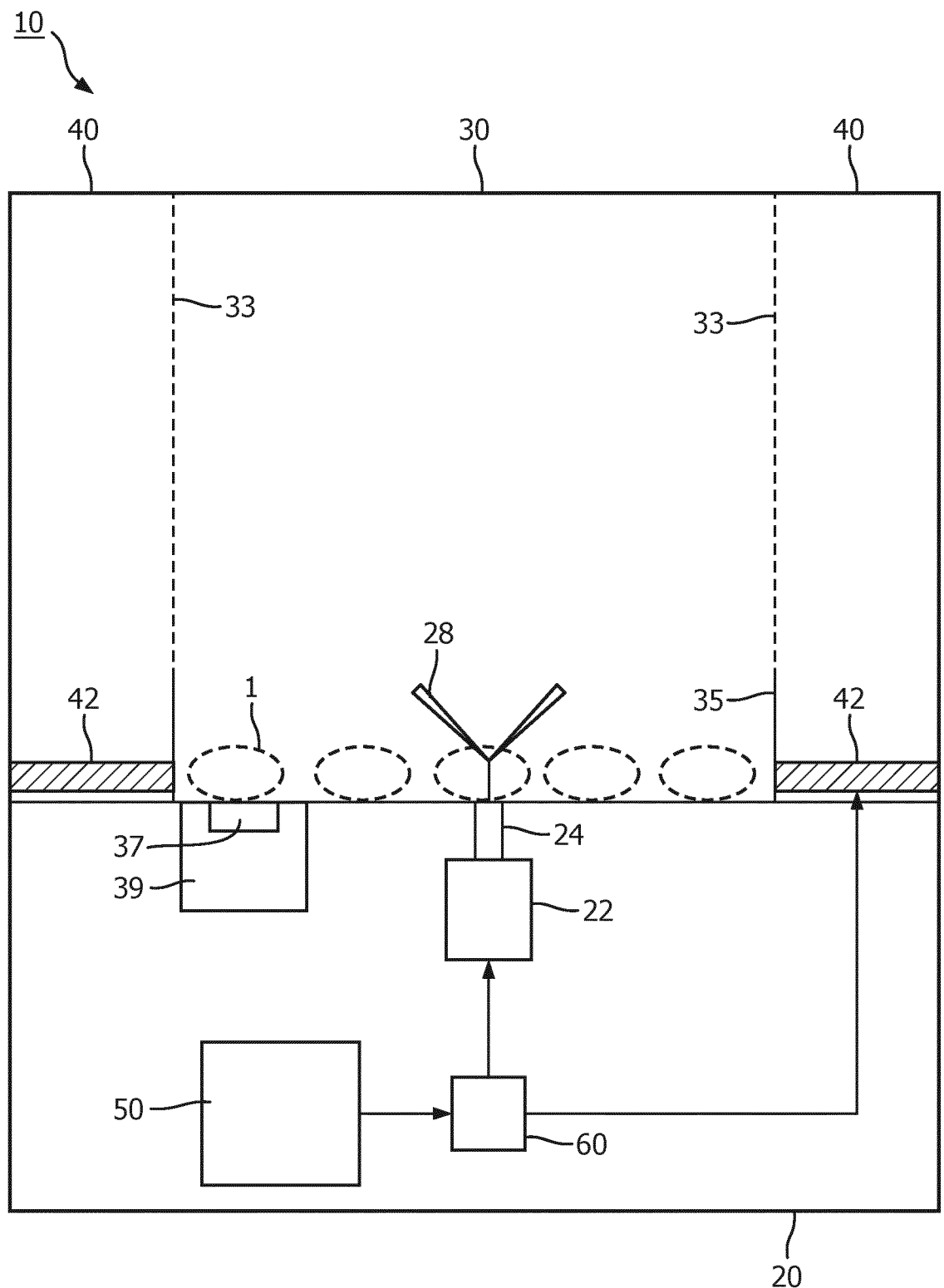
FIG. 6 schematically depicts a cross-sectional view of a food processing apparatus according to an embodiment.

FIG. 6 schematically depicts a cross-sectional view of another example embodiment of the food processing apparatus 10. In this embodiment, the water tank 40 forms part of a container further containing the food processing compartment 30. In this embodiment, the water tank 40 may be arranged around the food processing compartment 30, in which the partition wall 35 between the food processing compartment 30 and the water tank 40 comprises at least one aperture 33 such as a plurality of slits or the like through which steam generated in the water tank 40 by the heating element 42 under control of the controller 60 can enter the food processing compartment 30 in order to reduce the free sugar content of the food product 1 in the food processing compartment 30. Again, it is noted that the at least one aperture 33 is located above the maximum fill level of the water tank 40 in order to prevent water from directly entering the food processing compartment 30. The container containing the food processing compartment 30 and the water tank 40 may be removable as will be readily understood by the skilled person.

Figure 7:
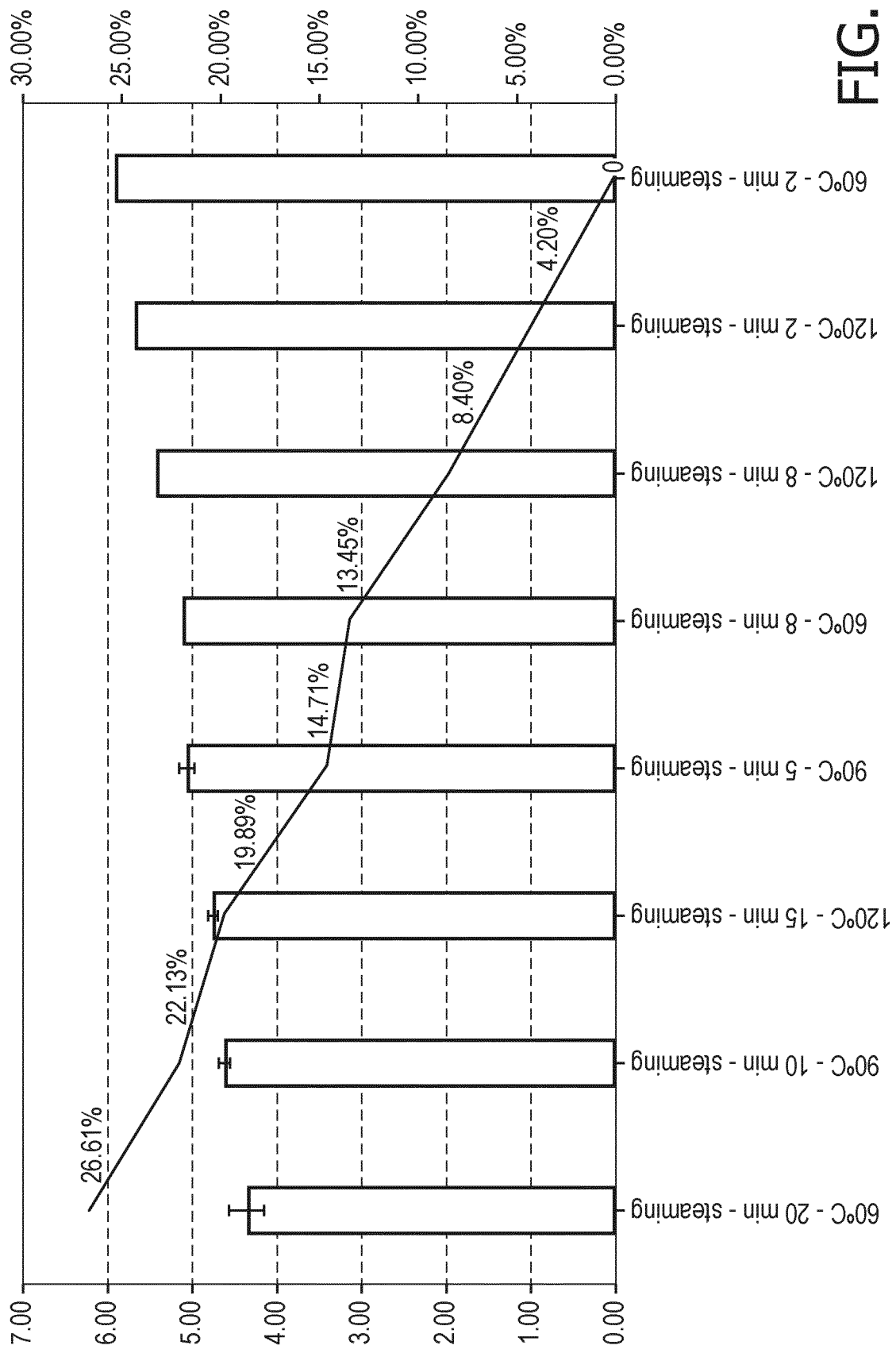
FIG. 7 is a graph displaying experimental results demonstrating proof of concept of the teachings of the present invention.
Figure 8:
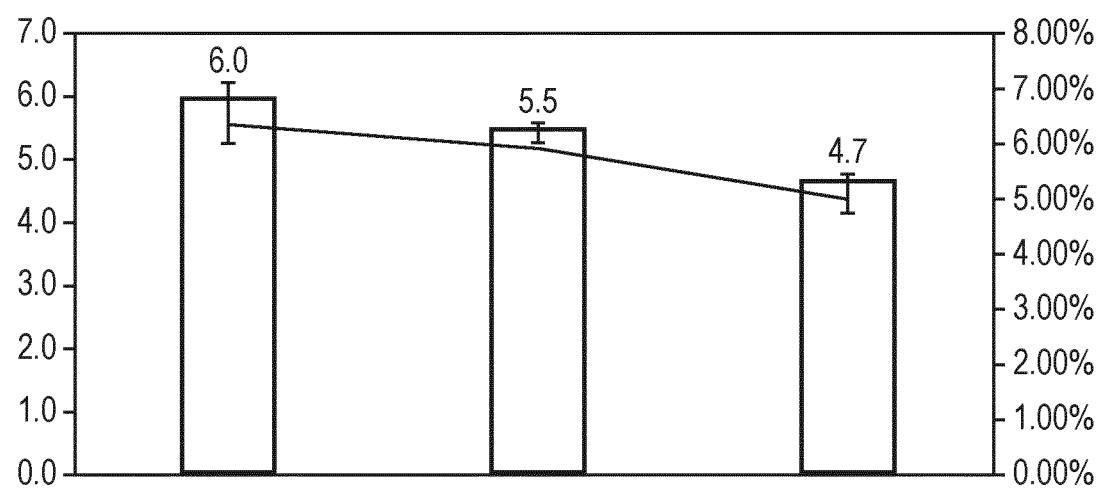
FIG. 8 is a graph demonstrating the effect on sugar content of an example food product when processed in a food processing apparatus according to an embodiment.
Figure 9:
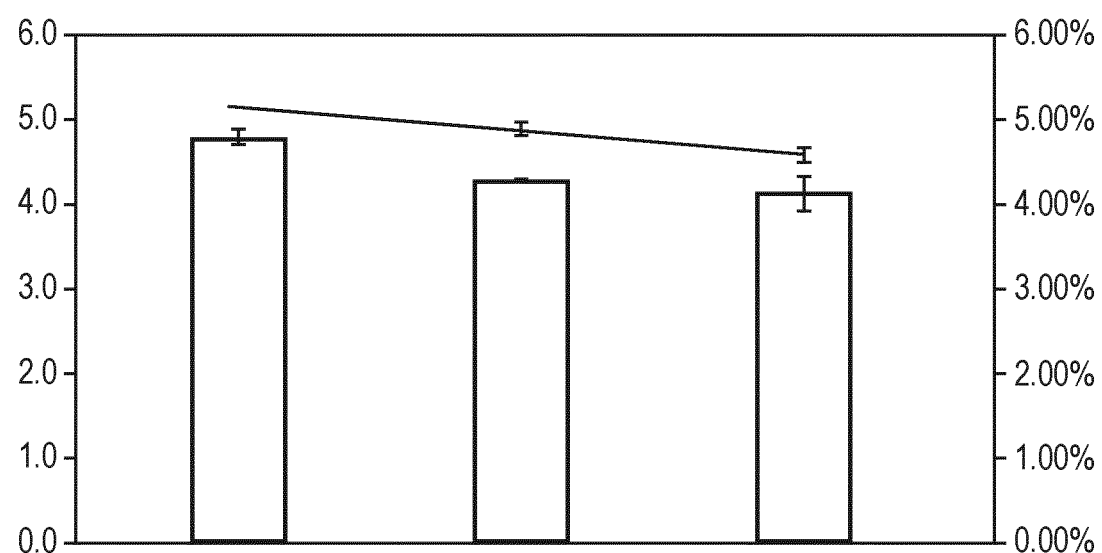
FIG. 9 is a graph demonstrating the effect on sugar content of another example food product when processed in a food processing apparatus according to an embodiment.

Proof of the ability to reduce the free sugar content of food products with such a food processing apparatus 10 will now be provided with the aid of FIG. 7-9, which depict various graphs of experimental results providing this proof of concept.

In a first set of experiments, slices of fresh apple were steamed in a traditional oven using the following steam temperatures and processing times:

60° C.-2 minutes steaming (control experiment)
60° C.-8 minutes steaming
60° C.-20 minutes steaming
90° C.-5 minutes steaming
90° C.-10 minutes steaming
120° C.-2 minutes steaming
120° C.-8 minutes steaming
120° C.-15 minutes steaming Following the steaming process, the steamed apple slices were blended with a Philips Innergizer countertop blender (model HR3868/00). After blending, the resulting apple pulps were filtered to obtain clear juice. The clear juice was evaluated to determine its sugar content and vitamin C. FIG. 7 shows the sugar content evaluation results for the different experiments as identified on the X-axis. The Y-axis displays the absolute sugar content of the clear juice for each experiment as indicated by each bar, whereas the line in FIG. 7 indicates the reduction in sugar content relative to the sugar content of clear fruit juice generated from the control experiment. FIG. 7 clearly demonstrates that for the longer durations of the steam treatment a particularly notable reduction in the sugar content of the resulting clear apple juice was obtained, with reductions in excess of 25% achievable. From this data, it can be deducted that a treatment duration in a range of 5-20 minutes yields attractive reductions in the sugar content of the apple juice. Moreover, it was found that treatment temperatures below 100° C., e.g. 60° C. and 90° C. more effectively retained vitamin C in the clear juice compared to treatments at higher temperatures, e.g. 120° C., such that an operating temperature of the heat treatment in a range of 60-90° C. is particularly preferable.

FIG. 8 shows the results of a set of experiments in which the clear apple juice was generated in three different ways:
(1) Directly blended from raw (untreated) apple (control experiment)
(2) From an apple cut in 8 chunks, which chunks were steamed at 60° C. for 20 minutes prior to blending
(3) From a finely sliced apple, which slices were steamed at 60° C. for 20 minutes prior to blending Each experiment was repeated four times to establish repeatability. For each experiment, the sugar content of the resulting juices was analyzed. In addition, the Brix value of each juice was independently determined using a Brix sensor. The results are shown in FIG. 8, in which the left bar shows the results of the apple juice generated in experiment (1), the middle bar shows the results of the apple juice generated in experiment (2) and the right bar shows the results of the apple juice generated in experiment (3). The value on the left side of the graph depicts the analyzed sugar content and the value on the right side of the graph depicts the determined Brix value of each clear juice.

It is clear from FIG. 8 that the steaming of the apple pieces prior to blending leads to noticeable reduction in the sugar content of the subsequently produced clear juice as the sugar content in the juices from experiments (2) and (3) is clearly lower than that of the clear juice from experiment (1). What is more, much more significant reduction in the sugar content of the juice produced in experiment (3) is obtained compared to experiment (2). This can be explained by the finer pieces of apple in experiment (3) compared to experiment (2), thus leading to a larger contact surface of the apple pieces with the generated steam in the heat treatment. Hence, it can be concluded that for best results, the user of the food processing apparatus 10 should partition the food product 1 in small pieces in order to obtain best results. However, overly small pieces should be avoided as this may disturb the cell matrix of the food product 1, thus leading to excessive loss of nutrients that ideally should be preserved. Therefore, it may be advisable for such slices to have a minimum diameter of 2-3 mm. Finally, although not shown in FIG. 8, it was found that the sugar content of the juices produced in the three experiments was highly reproducible; a variance of less than 4% in the determined sugar content between the various instances of each experiment was observed.

In order to demonstrate proof of principle for different types of food product, the above experiments in which a clear juice was produced were repeated using pears instead of apples:
(1) Directly blended from raw (untreated) pear (control experiment)
(2) From a pear cut in 8 chunks, which chunks were steamed at 60° C. for 20 minutes prior to blending
(3) From a finely sliced pear, which slices were steamed at 60° C. for 20 minutes prior to blending.

Each experiment was repeated four times to establish repeatability. Again, for each experiment a variance in the established sugar content of the clear juice of less than 4% was found. For each experiment, the sugar content of the resulting juices was analyzed. In addition, the Brix value of each juice was independently determined using a Brix sensor. The results are shown in FIG. 9, in which the left bar shows the results of the pear juice generated in experiment (1), the middle bar shows the results of the pear juice generated in experiment (2) and the right bar shows the results of the pear juice generated in experiment (3). The value on the left side of the graph depicts the analyzed sugar content and the value on the right side of the graph depicts the determined Brix value of each clear juice.

The trends for the pear juice as shown in FIG. 9 are comparable with the trends for the apple juice as shown in FIG. 8, with about 13.5 weight % of sugar removed from the clear juice from experiment 3 and 10.4 weight % of sugar removed from the clear juice from experiment 2 compared to the sugar content of the clear juice from experiment 1. This clearly demonstrates that the heat treatment of different types of food products prior to their blending can reduce the sugar content of the thus produced food item.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A food processing apparatus for reducing a sugar content of a fruit-based food product, the food processing apparatus comprising:
a food processing compartment including a blade arrangement and a fluid release valve;
a base including a motor arranged to drive the blade arrangement;
a heating arrangement for heating the food product in the food processing compartment with steam, the heating arrangement comprising a water tank in fluid communication with the food processing compartment and a heating element thermally coupled to said water tank; and
a controller arranged to control the motor and the heating element, wherein the controller is arranged to:
control the heating element to generate said steam such as to heat the food product in the food processing compartment for a defined period of time;
operate said fluid release valve to release, prior to blending the food product, steam condensate generated during the heating of the food product from the food processing compartment; and
control the motor to blend the food product upon termination of the heating of the food product for said defined period of time and upon releasing the steam condensate through said fluid release valve.

2. The food processing apparatus of claim 1, wherein the defined period of time is in a range of 5-20 minutes.

3. The food processing apparatus of claim 1, wherein the fluid release valve is controlled by the controller, and wherein the controller is adapted to open the fluid release valve for a further defined period of time during said heating of the food product and/or after said heating of the food product.

4. The food processing apparatus of claim 1, further comprising a steam condensate collection reservoir in fluid communication with said fluid release valve.

5. The food processing apparatus of claim 1, further comprising a user interface communicatively coupled to the controller and comprising a food product selection menu, wherein the defined period of time is a function of a food product selection made with the user interface.

6. The food processing apparatus of claim 5, wherein the controller is arranged to control the motor to blend the food product upon completion of said defined period of time for a further period of time that is a function of the food product selection made with the user interface.

7. The food processing apparatus of claim 6, wherein the food product selection menu comprises a food product weight specification option, and wherein the further period of time is a function of a food product weight specified with said food product weight specification option.

8. The food processing apparatus of claim 1, further comprising a temperature sensor in said food processing compartment that is communicatively coupled to the controller, wherein the controller is arranged to operate the heating arrangement in response to temperature data provided by said temperature sensor.

9. The food processing apparatus of claim 8, wherein the controller is arranged to control the heating element to generate said steam such as to heat the food product in the food processing compartment to a temperature in a range of 60-90° C.

10. The food processing apparatus of claim 1, wherein:
the water tank is located in the base; and
the food processing compartment comprises a container having a first surface comprising at least one aperture for injecting said steam from the water tank into the food processing compartment and a second surface comprising the blade arrangement, and wherein each of the first surface and the second surface can be fitted onto the base.

11. The food processing apparatus of claim 1, wherein the water tank is arranged adjacent to the food processing compartment, and wherein a partition between the water tank and the food processing compartment comprises at least one aperture for injecting said steam from the water tank into the food processing compartment.

12. The food processing apparatus of claim 1, wherein the food processing apparatus is a blender or a juice maker.

* * * * *